Jan. 13, 1970　　I. N. MacKAY ET AL　　3,489,158
TUBE CLOSURE BALL VALVE

Filed Nov. 16, 1966　　2 Sheets-Sheet 1

INVENTOR.
IAN NORTON MacKAY
JOHN LAURANCE IRVINE
BY
R.O.Icksley
PATENT AGENT

Jan. 13, 1970     I. N. MacKAY ET AL     3,489,158
TUBE CLOSURE BALL VALVE

Filed Nov. 16, 1966     2 Sheets-Sheet 2

INVENTOR.
IAN NORTON MacKAY
JOHN LAURANCE IRVINE
BY

PATENT AGENT

United States Patent Office 3,489,158
Patented Jan. 13, 1970

3,489,158
TUBE CLOSURE BALL VALVE
Ian Norton MacKay and John Laurance Irvine, Peterborough, Ontario, Canada, assignors to Canadian General Electric Company Limited, Toronto, Ontario, Canada, a Canadian company
Filed Nov. 16, 1966, Ser. No. 594,879
Int. Cl. F17d 1/08; G21c 19/00; F16k 5/20
U.S. Cl. 137—1                                          8 Claims

ABSTRACT OF THE DISCLOSURE

A ball valve giving full bore access to a tube in an irradiated environment provides sealing between the metallic valve seat and a metallic closure member, which meber is lifted off the seat when valve opening and closing is effected.

---

This invention is directed to an improved ball valve.

It is well known to use ball valves in order to seal tubes containing fluid such as liquids. In the nuclear reactor field, it is essential that certain valves shall provide trouble-free occasional operation over a prolonged period of time such as thirty years while maintaining a very high sealing capability, in view of the costly liquids such as deuterium oxide (heavy water) being contained by the valve.

In order to effect the desired highly effective seal in a zone of high neutron and gamma radiation activity, where non-metallic seals are generally inoperable it is usual to increase the sealing pressure between the metallic valve closure member and the metallic valve seat. However, this has the disadvantage that frequent operation of the valve closure member across the seat produces undue wear of one or other or both of these members. Accordingly the present invention provides a closure member movable in two modes and adapted to reduce the rubbing forces between the valve closure member and the valve seat, while at the same time providing effective sealing therebetween when in the closed condition.

In order that valves according to the present invention can be utilized at the lower end of a calandria pressure tube, to provide fuelling access thereto for an underfuelling machine as described in copending Canadian application Ser. No. 945,819, filed Nov. 20, 1965, inventor I. N. MacKay, the valve may be combined with an adaptor to which the refuelling machine can be locked during the refuelling process. In order that the refuelling machine may have complete access to the calandria tube, it is necessary that the passage through the valve when in the open condition shall approximate to the full internal diameter of the calandria tube.

In order that a valve according to the present invention may be operated by a refuelling machine as set forth in the above mentioned copending application, it is proposed that the rotational axis of the valve ball member shall be inclined at an oblique angle to the main axis of the calandria tube, thus making it possible to provide the valve with a downwardly inclined control spindle which can be fitted in to the very limited space available.

The following is a description by way of example of certain embodiments of the present invention, reference being had to the accompanying drawings, in which.

Figure 1:
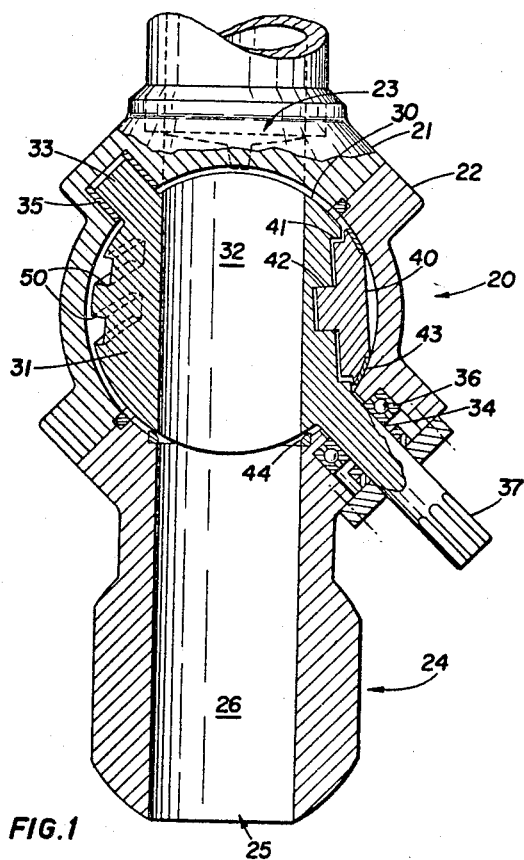
FIGURE 1 shows a sectional elevation of a tube end fitting incorporating a valve according to the present invention.

Referring to FIGURE 1 the valve 20 shown secured to the lower end of a tube such as a calandria tube comprises a split housing 21 and 22, the upper housing portion 21 having an outlet 23 to receive the tube, the lower housing portion 22 being shown extended to include an end fitting 24 with an inlet 25 therethrough connecting with the valve by way of a passage 26.

The valve closure means 30 comprises a substantially ball-shaped member 31 having a passage 32 extending therethrough. The ball 31 is pivotally mounted on trunnions 33, 34 mounted in bearings 35, 36, and having a splined actuating shaft 37 extending therefrom.

The valve closure member 40 is shown slidably mounted in recess 42 of the ball 31, being capable of sliding motion radially outwardly of the ball and of taking up some angular misalignment permitted by clearance at 41, and having an annular metallic sealing ring 43 of relatively soft material such as nickel on an outer surface adapted to be brought into sealing contact with a seat 44 at the inlet to the valve lower housing 22. The annular seat 44 is of a generally hard material such as Stellite, secured to the valve inlet as by welding or weld deposition.

It will be seen that rotation of the valve control shaft 37 will move the valve ball 31 from the open position illustrated wherein the passage 32 constitutes an extension of the tube inner surface, providing clear connection with the passage 26, to a closed position wherein the closure member 40 slides across the valve inlet seat 44 so that in the closed position the seal ring 43 is pressed into tight sealing contact with the Stellite seat 44.

Under operating conditions typical of a nuclear reactor, the tube is a pressure tube operating at a pressure in the order of 1500 pounds per square inch, containing a coolant liquid such as heavy water. The pressure of the coolant within the tube forces the closure member 40 to seal tightly upon the seat 44, the seal ring 43 and the seat 44 having lapped finishes. The shape of the seat 44 is such that the unit contact pressure between the ring 43 and seat 44 approaches the yield strength of the material of the ring 43 under operating conditions.

In order to open the valve 20 in a manner to avoid scoring the seal ring 43, the closure member 40 is lifted off its seat as by the application of hydraulic pressure to the underface thereof by way of the valve inlet 25. Upon equilization of the pressure at the inlet with that at the outlet of valve 20, it is then possible to rotate the control shaft 37 and move the valve into the open position without producing undue wear upon the seal ring 43, the member 40 being free to slide slightly in a wiping motion across the valve seat 44.

Figure 2:
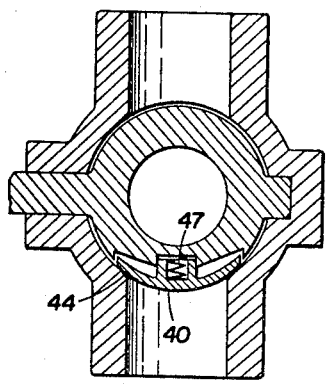
FIGURE 2 shows a portion of a valve and closure member having a modified seating arrangement.
Figure 3:
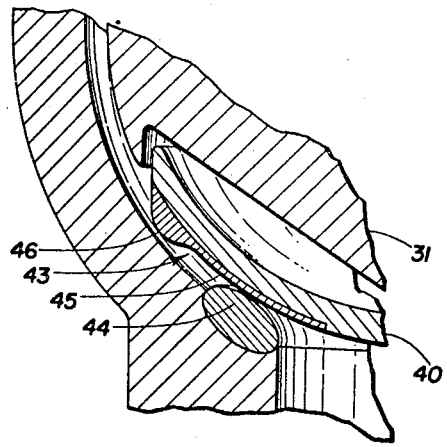
FIGURE 3 is an enlarged view of a portion of FIGURE 2.
Figure 4:
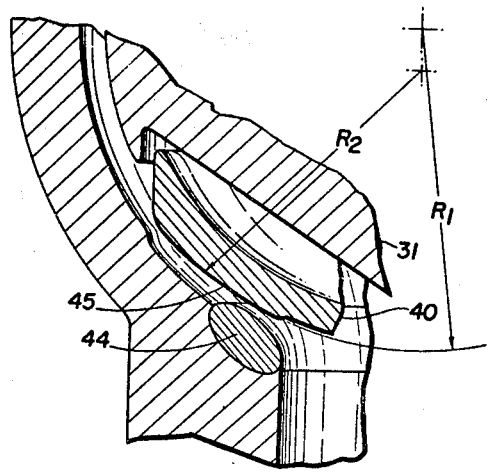
FIGURE 4 shows an alternative embodiment to that illustrated in FIGURE 2.

In the embodiment illustrated in FIGURE 2, the closure member 40 has a closure spring 47 acting thereagainst. Referring to FIGURE 3 it will be seen that the Stellite seat 44 comes in sealing contact with a smooth portion 45 of the seal ring 43, while in intermediate positions movement of the closure member 40 produces rubbing contact of the raised annular rib 46 of the seal ring 43 against the inner faces of the valve housing 22. Thus undue wear of the soft seal ring 45 is precluded. Referring to FIGURE 4 this alternative arrangement shows the use of a seal surface 45 having a relatively large radius of curvature R1, and a rubbing surface 48 having a shorter radius of curvature R2 adapted to provide a protective clearance of the seal ring surface 45. This latter embodiment facilitates the lapping of the closure member 40 to the Stellite seat 44 of the valve inlet, or to a lapping tool of appropriate curvature.

Referring to the ball 31 illustrated in FIGURE 1, one or more grooves 50 on the upper portion of the ball are adapted to interlock with a detent member such as a spigot projecting downwards from and forming part of the shielding plug used to support nuclear fuel slugs, situated in the tube secured to valve outlet 23. While the ball 31 is free for limited rotation in an opening direction to provide access through the valve so as to admit a probe portion of the refuelling machine disclosed in the aforementioned copending application, the ball 30 may not move to its fully open position until the shielding plug detent resting in the slots 50 has been raised from its interlocking contact by the inserted probe.

While the foregoing disclosure is particularly directed to a ball valve adapted for use with a nuclear reactor, it will be clearly understood that a ball valve according to the present invention may be utilized in other locations, being particularly suited to provide a tight seal together with minimal wear characteristics.

Owing to the beneficial wiping action of the closure member 40 across the inlet seat 44, the deposition of solids which might cause valve fouling is minimized.

What we claim as new and desired to secure by Letters Patent of the United States is:

1. A tube sealing valve, comprising; valve housing means having an inlet opening and an outlet opening for attachment to a tube; annular valve seat means within said housing encompassing a said opening; and valve closure means rotatably mounted within said housing for rotation about an axis inclined to the axis of said tube and having a flow passage extending therethrough, a sealing member mounted on said closure means for rotation therewith, being movable substantially radially relative thereto and angularly positioned from said flow passage, whereby on pivotal movement of said valve closure means about said inclined axis, said sealing member is deflected from said valve seat to substantially preclude the rubbing of said sealing member across said valve seat.

2. A tube sealing valve as claimed in claim 1, wherein said valve closure means includes a rotary actuator shaft extending obliquely downwardly from said valve to permit actuation of the valve from a position beneath the valve.

3. A tube sealing valve as claimed in claim 1 including a raised annular rib member on said valve closure means adapted to provide displacement of said closure means normal to said valve seat, whereby on transverse movement of said closure means relative to said valve seat said rib maintains the sealing surface of said closure means out of rubbing contact with said annular valve seat, except in the closed position.

4. A tube sealing valve as claimed in claim 1, wherein said closure means includes a sealing portion with a first inner annular seat portion of having a spherical surface and a second adjoining concentric outer annular seat portion also having a spherical surface, said first surface portion having a greater radius than said second portion, whereby on displacement of said closure means relative to said valve seat said portions of lesser spherical radius constitues a rubbing ring to maintain said portion of greater spherical radius clear of rubbing contact with said valve seat.

5. A tube sealing valve as claimed in claim 1, in combination with a lock-on fitting adapted for sealing and locking engagement with a refuelling machine snout, said lock-on fitting extending from said valve housing inlet and providing unrestricted access thereto.

6. A tube sealing valve as claimed in claim 1, wherein said valve closure means is of substantially spherical form having a cylindrical bore extending therethrough, and interlock groove means on the spherical outer surface of the closure means in substantial coincidence with said valve outlet when in the closure position, and adapted for engagement with plug detent means located in said tube to permit limited opening of said closure means for the insertion of probe means through said bore from the inlet to the outlet, whereby the probe means can position the plug detent means axially in relation to the interlock groove means.

7. A tube sealing valve, comprising; a valve housing having an inlet opening and an outlet opening for attachment to a calandria pressure tube of a nuclear reactor, said inlet and said outlet being in axial alignment with said tube; and annular valve seat adjacent said valve inlet and extending thereabout; a substantially spherical valve member rotatably mounted within said housing having a substantially cylindrical flow way extending therethrough movable in the valve open position into axial correspondence with said inlet and said outlet and providing unrestricted access to the bore of said calandria tube; closure means mounted on said spherical valve member for radial movement relative thereto; spring means biasing said closure means radially outwardly relative to said spherical member; and actuator shaft means from said spherical member extending through said housing in sealing relation therewith, and downwardly therefrom at an oblique angle to said tube, whereby said valve may be selectively operated from below.

8. The method of operating a tube closure valve having the valve outlet attached in sealing relation with a tube containing liquid at a high pressure, wherein the closure member of said valve is held in sealing relation with a valve seat surrounding the valve inlet by pressure exerted from within said tube being applied through said valve outlet, said closure member being movable in a first direction substantially normal to said valve seat and in a second direction transversely of said seat; including the step of applying pressure to said valve member to provide an unsealing force on said closure member in excess of and in opposition to the sealing force applied by said pressure liquid in said tube, whereby said closure member is displaced from said seat in said first direction, to permit relatively free subsequent movement of said closure member in a said second direction with reduced rubbing force between said closure member and said seat.

References Cited

UNITED STATES PATENTS

| 3,270,772 | 9/1966 | Rakus | 251—315 X |
| 3,006,602 | 10/1961 | Usab | 251—315 |
| 2,998,957 | 9/1961 | Vulliez | 251—86 |
| 3,284,046 | 11/1966 | Allenbaugh | 251—315 |

LEONARD D. CHRISTIAN, Primary Examiner

U.S. Cl. X.R.

251—314